United States Patent [19]

Phillips et al.

[11] Patent Number: 4,699,624

[45] Date of Patent: Oct. 13, 1987

[54] WATER-SOLUBLE VINYL SULFONYL-TYPE REACTIVE MONOAZO YELLOW DYESTUFF MIXTURES WITH HIGH COLOR YIELD

[75] Inventors: Thomas S. Phillips, West Warwick; Anthony J. Corso, Coventry, both of R.I.

[73] Assignee: Hoechst Celanese Corporation, Somerville, N.J.

[21] Appl. No.: 848,888

[22] Filed: Apr. 7, 1986

[51] Int. Cl.[4] .................. C09B 67/02; C09B 62/00; C09B 29/00

[52] U.S. Cl. ........................... 8/524; 8/549; 8/641; 8/683; 8/918

[58] Field of Search .................. 8/549, 641, 524

[56] References Cited

U.S. PATENT DOCUMENTS 4,427,413  1/1984  Bauerle .................. 8/471
4,548,613 10/1985  Bode et al. .............. 8/638

FOREIGN PATENT DOCUMENTS 2108141  5/1983  United Kingdom .

Primary Examiner—A. Lionel Clingman
Attorney, Agent, or Firm—Hugh C. Crall

[57] ABSTRACT

This invention is directed to mixtures of water-soluble, fiber reactive yellow dyestuffs which exhibit superior build-up and color properties over those properties obtained with the individual components of the mixtures. The dyestuffs disclosed herein have the following general formula in their free acid form:

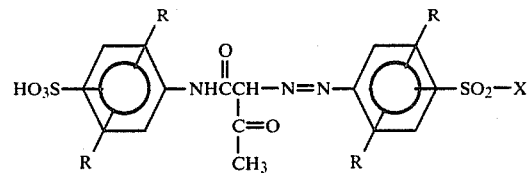

wherein R is lower alkyl, lower alkoxy or hydrogen and wherein X is —CH=CH$_2$ or —CH$_2$CH$_2$—Z wherein Z is —OH, —Cl, —Br, —OSO$_3$H, —SSO$_3$H, OPO$_3$H$_2$ or —N(R$_1$)$_2$, and wherein R$_1$ is lower alkyl or hydrogen.

14 Claims, No Drawings

WATER-SOLUBLE VINYL SULFONYL-TYPE REACTIVE MONOAZO YELLOW DYESTUFF MIXTURES WITH HIGH COLOR YIELD

BACKGROUND OF THE INVENTION

This invention relates to mixtures of water-soluble, fiber-reactive, yellow, azo dyestuffs with superior color yield and improved build-up properties. Color yield as used in this specification is the amount of color spectrally measured in standard color density units imparted by the dyestuff to a fabric or other substrate. Build-up is the ability of a dyestuff to continue to yield deeper or darker shades of a color as the concentration of the dyestuff in the dye bath is increased which is also expressed in color density units.

Typically, the color yield of an admixture of azodyestuffs is proportional to the solar yield and the amount of the components in the mixture. In general the color yield of a mixture will not exceed the color yield of the strongest component of the mixture. Surprisingly, we have found that the color yield of the azo dyestuff mixtures of this invention are significantly higher than the color yield of individual components. Secondly, these mixtures of the invention have improved build-up properties over the individual components.

An exception to this general rule is reported in British Pat. No. 2,108,141 wherein certain mixtures of blue, monoazo disperse dyes are reported having good build-up properties and high tinctorial strength superior to the effect achieved by the application of any single component of the dye mixture. U.S. Pat. No. 4,548,613 reports that certain mixtures of monoazo, yellow disperse dyes (CI Disperse Yellow 54 and 64) produce dyeings of high tinctorial strength, and high dye bath exhaustion. U.S. Pat. No. 4,427,413 discloses other mixtures of these same disperse dyes (CI Disperse Yellow 54 and 64) with improved build-up and better yields in transfer printing. Although these exceptions to the general rule report improved higher color yield or other improved properties they are exceptions.

SUMMARY OF THE INVENTION

This invention is that of a water-soluble, fiber-reactive, yellow azo dyestuff mixture comprising a first and a second azo dyestuff having in their free acid form the following general formula (1):

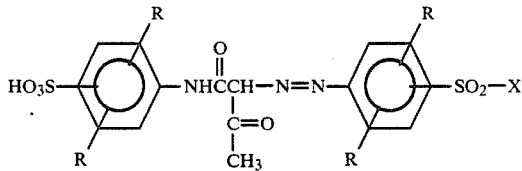

wherein X is $-CH=CH_2$ or $-CH_2-CH_2-Z$. The moiety Z may be either OH, $-Cl$, $-Br$, $-OSO_3H$, $-SSO_3H$, $-OPO_3H_2$, or $-N(R_1)_2$ wherein the moiety $R_1$ is independently selected from a one to four carbon atom lower alkyl and hydrogen. The moiety R is independently selected from lower alkyl and lower alkoxy groups having one to four carbon atoms and hydrogen; preferably lower alkyl or alkoxy. However, at least one of said R moieties is selected from lower alkyl in at least one of said dyestuffs and each of said dyestuffs contain at least two R groups selected from lower alkoxy whereby the mixture of said first and second dyestuffs results in a dyestuff mixture which upon application has a superior color yield than that of the individual components of the mixture. The dyestuffs mixtures of this invention also have improved build-up properties as the concentration of the dyestuff mixture is increased in the dye bath.

The azo dyestuff mixtures of this invention are useful in coloring and printing fibers and other materials such as leather which contain carbonamide (NH—) and hydroxy (OH—) groups. They provide brillant yellow shades on cellulosic materials and have improved color yield, build-up and fastness properties.

DESCRIPTION OF THE PREFERRED EMBODIMENTS

The present invention is directed to novel mixtures of water-soluble yellow monoazo dyestuffs. The individual dyestuffs may be prepared in the conventional manner by coupling a n-acetoacetyl derivative of an alkyl and/or alkoxy substituted aniline sulfonic acid with a diazotized, fiber-reactive aniline. The coupling reaction is carried out under conventional conditions for the preparation of fiber reactive azo compounds; e.g. in an aqueous medium, at a temperature between 0° and 30° C., preferably 5° to 15° C. and at a pH between 3 and 8 preferably between 4 and 7. Although the following examples use the procedure of preparing each dyestuff separately and then mixing the components, it is apparent that the diazotization and coupling reactions can be sequentially conducted in admixture.

After preparation, the dyestuff may be isolated as a powder, either by salting it out of solution or by spray drying and brought to standard strength by the addition of an inorganic salt. Advantageously, the prepared dyestuff may be recovered as a liquid composition which can be brought to a standard strength by the addition of water. Alternatively, the standardization of the dyestuff mixture may be carried out after mixing the individual components.

The dyestuff mixtures of the invention comprise a first and a second dyestuff which have the following general formula (1) in their free acid form:

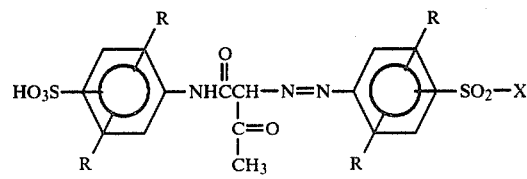

The substituent R is independently selected from lower alkyl and lower alkoxy groups having one to four carbon atoms and hydrogen; preferably lower alkyl and alkoxy. It being understood that the components of the mixture have different specific formulae. At least one of the dyestuff components in the mixture contains at least one lower alkyl substituent and that each component dyestuff contains at least two lower alkoxy substituents.

The ring substituents in the above general formula (1) may be selectively positioned on the rings by known methods readily apparent to one skilled in the art. Preferably, the substituent R is positioned 2,5, 2',5' and the $-SO_2X$, $HO_3S-$ moieties are positioned 4 and 4', respectively. Other illustrative isomers have the following ring positions:
R—2,5, 2',5' and $SO_2X$, $HO_3S-$ 3,3'

R—2,4, 2',4' and SO$_2$X, HO$_3$S— 5,5'
R—3,5, 3',5' and SO$_2$X, HO$_3$S— 2,2'
R—2,4, 2',5' and SO$_2$X, HO$_3$S— 5,3'

However, regardless of the isomeric position of the ring substituents, the acetoacetamidazo chromophore of general formula (1) will give a yellow dyestuff. The shade or tone of the yellow dyestuff being dependent upon the type and position of the ring substituents. Similarly, the sulfonic acid moiety may be replaced with a carboxylic acid moeity.

The substituent X is —CH=CH$_2$ or —CH$_2$—CH$_2$—Z in which Z is a moiety that can be eliminated by the action of an alkaline agent. the moiety Z for example may be —OH, —CL, —Br, —OSO$_3$H, —SSO$_3$H, —OPO$_3$H$_2$ or —N(R$_1$)$_2$, where R$_1$ may be a lower alkyl of one to four carbon atoms or hydrogen. Preferably X is the beta-sulfatoethyl group.

Preferred mixtures of this invention comprise mixtures of the following dyestuffs having the following formula:

MIXTURE I

Example 2 Dye

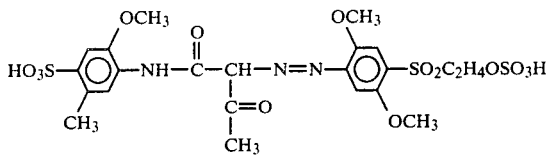

and

Example 1 Dye

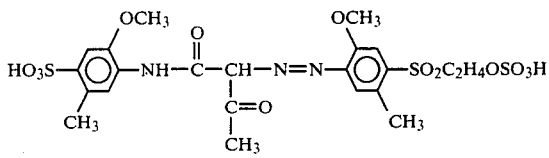

MIXTURE II

Example 2 Dye

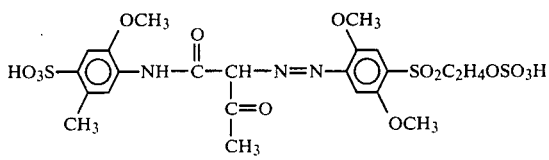

and

Example 3 Dye

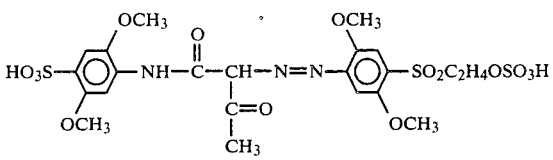

These dyestuff mixtures (Mixture I and Mixture II) may contain 5% to 95% of the first component, (Example 2 Dye), and 95% to 5% of the second component; preferably 80% to 20% of the first component and most preferably 60% to about 40% of the first component. The above percentages are weight percent of dye. This basis is used through the remainder of this specification and the claims unless otherwise noted. It also is understood that the mixed dyestuffs of this invention may be used in conjunction with other dyes.

Another preferred mixture of the invention is:

MIXTURE III

Example 1 Dye

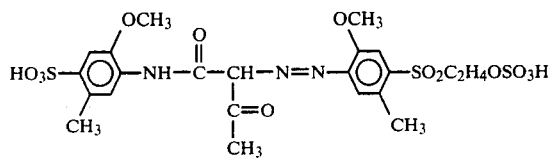

and

Example 3 Dye

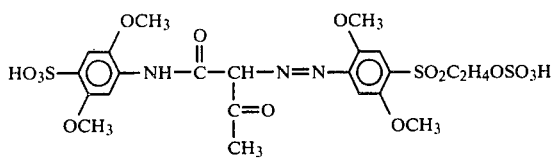

In the above mixture the first component (Example 1 dye) may be present in an amount of 95 to 80 percent, preferably about 85% to 90% and most preferably about 85% by weight of the dye. However, when the concentration of the Example 1 Dye component is reduced to less than about 80% a determinmental effect in color yield is observed.

The dyestuff mixtures of the present invention are suitable for the dyeing of cellulosic materials such as cotton, linen, viscose rayon or staple fibers. They can be applied by any one of the usual dyeing and printing methods for reactive dyestuffs and they yield on cellulosic materials, in the presence of alkaline agents, brilliant yellow shades having excellent fastness properties, and particularly superior color yield and build-up in both exhaust and continuous dyeings. The present dyestuffs may also be used on other fibers containing reactive groups e.g. wool, silk or polyamide fibers.

The following examples further illustrate this invention but are not intended to limit it thereto. The percentages and parts are by weight unless noted otherwise.

EXAMPLE 1

This example illustrates the preparation of a dye having the formula:

Example 1 Dye

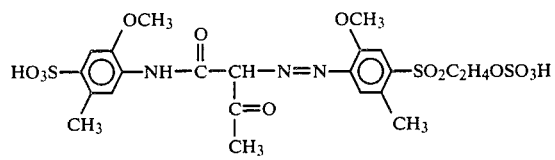

65.0 parts of 2-methoxy-5-methylaniline-4-B-sulfatoethylsulfone were dissolved in 200 parts of water at 35° C. and pH 5.5–6.0 by the addition of 13 parts of sodium carbonate. The resulting solution was cooled to 0°–5° C. with ice and 50 parts of 31% hydrochloric acid were acid. The slurry was diazotized by the addition of 35 parts of a 39.5% sodium nitrite solution. The excess nitrite was decomposed by the addition of 1 part of sulfamic acid. 10 parts of filter aid were added and the diazo solution was clarified and added to an aqueous solution containing 60.2 parts of 2-methoxy-5-methyl-4-sulfo-acetoacetanilide while maintaining the pH at 4.5–5.0 by the addition of 15 parts of sodium carbonate. The resulting dyestuff solution was warmed to 50° C. and the dyestuff salted out by the addition of 300 parts of sodium chloride. After filtration and drying, 143.1 parts of dyestuff were obtained having a strength of 65:100 (i.e., 65 parts of synthesized dyestuff were equal in strength to 100 parts of standard strength dyestuff). The 143.1 parts so obtained were blended with 77.0 parts of anhydrous sodium sulfate to yield 220.1 parts of dyestuff powder of standard strength with a dye content of 58.2% (weight percent).

EXAMPLE 2

This example illustrates the preparation of a dye having the formula

Example 2 Dye

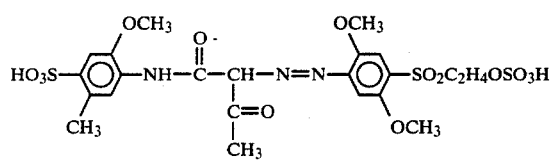

68.2 parts of 2,5-dimethoxyaniline-4-B-sulfoxyethyl-sulfone were dissolved in 320 parts of water at pH 6.0–6.5 by the addition of 14 parts of sodium carbonate. 28 parts of Celite and 8 parts of Fuller's Earth and 4 parts of Darco S-51 were added and the solution clarified. The filter cake was washed with 100 parts of water. 28 parts of 93% sulfuric were added, the solution iced to 0°–5° C. and diazotized with 33.8 parts of a 40.1% sodium nitrite solution. The excess nitrite was decomposed by the additionn of 1 part of sulfamic acid. The diazo solution was then added to a solution containing 56 parts of 2-methoxy-5-methyl-4-sulfo-acetoacetanilide while maintaining the pH at 4–5 by the addition of 16 parts of sodium carbonate. The resulting solution was spray dried to yield 188.3 parts of dyestuff having a strength of 60:100 (i.e., 60 parts of the synthesized dyestuff were were equal in strength to 100 parts of standard strength dyestuff.) The 188.3 parts of dyestuff so obtained were blended with 125.5 parts of anhydrous sodium sulfate to yield 313.8 parts of dyestuff powder of standard strength with a dye content of 42.2% (weight percent).

EXAMPLE 3

This example illustrates the preparation of a yellow monoazo dyestuff wherein the phenyl rings of the compound are methoxy substituted. The compound has the formula:

Example 3 Dye

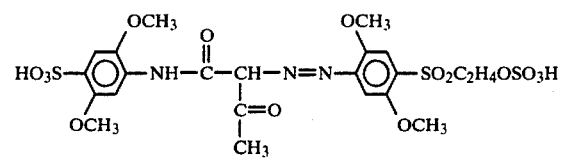

102.3 parts of 2,5-dimethoxyaniline-B-sulfatoethylsul-fone were dissolved in 480 parts of water by the addition of 20.4 parts of sodium carbonate. 42 parts of Celite, 12 parts of Fuller's Earth and 6 parts of Darco S-51 were added and the solution clarified. The filter cake was washed with 150 parts of water. 42 parts of 93% sulfuric acid were added, the solution cooled to 0°–5° C. with ice, and diazotized by the additionn of 51 parts of a 40% sodium nitrite solution. The excess nitrite was decomposed by the addition of 1 part of sulfamic acid. The diazo solution was then added to a solution containing 88.8 parts of 2,5-dimethoxy-4-sulfo-acetoacetanilide and maintaining the pH at 4–5 by the addition of 28 parts of sodium carbonate. The resulting solution was spray dried to yield 300 parts of dyestuff having a strengthh of 60:100 (i.e., 60% parts of the synthesized dyestuff were equal in strength to 100 parts of standard strength dyestuff). The 300 parts so obtained were blended with 200 parts of sodium chloride to yield 500 parts of dyestuff powder of standard strength with a dye content of 39.4% (weight percent).

The following Examples 4–6 were prepared by mixing the dyestuffs of Examples 1–3 in the proportions indicated and applied to test fabrics using a standard exhaust dyeing procedure. The color yield on the dyed test fabrics were analyzed using a spectrophotometer, computer assisted system and determined in color density units. The colorant reported in the Examples is weight of dyestuff of standard color strength based upon the weight of the test fabric in the dye bath.

The following exhaust dyeing procedure was used in preparing the dyed specimens upon which color measurements were determined. A 20:1 boiled-off, cotton knitted into socks was used as the fabric. Prior to dyeing the fabric was scoured in an aqueous solution of scouring agent (trade designation Carbapon SR) at a concentration of 0.5 grams per liter for 5 minutes at the boil and then rinsed with hot water.

A dye bath solution was prepared at 80° F. It contained 1.0% based upon the weight of the test fabric of a polyphosphate sequestering agent of the neutral type, common salt, soda ash, caustic soda, and dyestuff. The dyeings were conducted a 1:10 liquor ratio.

An amount of salt, soda ash and caustic soda were added in each dyeing depending on the total concentration of the dyestuff in the dye bath according to the following schedule:

| Dyestuff % | Salt* | Soda Ash* | Caustic Soda** |
|---|---|---|---|
| 0.01–0.10 | 25.00 | 3.00 | 0 |
| 0.11–0.20 | 25.00 | 5.00 | 0 |
| 0.21–0.50 | 50.00 | 2.00 | 0.50 |
| 0.51–2.00 | 75.00 | 3.00 | 1.50 |
| 2.01–4.00 | 100.00 | 5.00 | 2.50 |

*grams/liter.
**50% strength, grams/liter

The dye bath solution and test specimen were sealed in metal cans, heated to 140° F. under agitation at a rate of 2° F. per minute and held at 140° F. for 45 minutes. After completing the 45 minute dyeing period, the specimens were rinsed with cold running tap water until bleeding stopped. They were then neutralized with a 1% solution of acetic acid (56% strength) for one minute at 160° F., washed with a 0.25% soap solution for 3 minutes at 200°–210° F., rinsed for five minutes at 160° F. and dried. The term liquor ratio as used in the foregoing description is the weight ratio of fabric to dye bath solution.

Dyeing were prepared by the foregoing procedure using the individual component dyestuffs and mixtures of the dyestuffs. The results are as follows. Color yield is reported in color density units (CDU). The actual dye content of the colorants used in the following examples were as follows: Ex. 1 Dye—58.2%, Ex. 2 Dye—42.2%, and Ex. 3 Dye—39.4% by weight.

EXAMPLE 4

| % Colorant | Color Yield | | |
|---|---|---|---|
| | Example 2 Dye | Example 1 Dye | 50:50 Mix |
| 1 | .251 | .308 | .275 |
| 2 | .436 | .469 | .497 |
| 4 | .638 | .505 | .732 |
| 6 | .766 | .558 | .916 |
| 8 | .759 | .578 | .938 |
| 10 | .706 | .560 | .935 |

EXAMPLE 5

| % Colorant | Color Yield | | |
|---|---|---|---|
| | Example 2 Dye | Example 3 | 50:50 Mix |
| 1 | .202 | .211 | .208 |
| 2 | .382 | .271 | .337 |
| 4 | .591 | .355 | .567 |
| 6 | .654 | .434 | .727 |
| 8 | .681 | .399 | .817 |
| 10 | .683 | .458 | .858 |

EXAMPLE 6

| % Colorant | Example 1 Dye | Example 3 Dye | 80:20 Mix |
|---|---|---|---|
| 1 | .347 | .248 | .320 |
| 2 | .482 | .384 | .539 |
| 4 | .531 | .503 | .685 |
| 6 | .631 | .565 | .777 |
| 8 | .641 | .581 | .809 |
| 10 | .609 | .552 | .825 |

The following Examples 7–9 were at a 4% dyestuff concentration using varying percentages of the individual components.

EXAMPLE 7

| 4% Exhaust Dyeing | | |
|---|---|---|
| Example 2 Dye | Example 1 Dye | Color Yield |
| 100 | 0 | .672 |
| 80 | 20 | .741 |
| 60 | 40 | .807 |
| 50 | 50 | .871 |
| 40 | 60 | .907 |
| 20 | 80 | .713 |
| 0 | 100 | .513 |

EXAMPLE 8

| Example 2 Dye | Example 3 Dye | Color Yield |
|---|---|---|
| 100 | 0 | .754 |
| 80 | 20 | .797 |
| 60 | 40 | .837 |
| 50 | 50 | .813 |
| 40 | 60 | .772 |
| 20 | 80 | .730 |
| 0 | 100 | .507 |

EXAMPLE 9

| Example 1 Dye | Example 3 Dye | Color Yield |
|---|---|---|
| 100 | 0 | .677 |
| 80 | 20 | .844 |
| 60 | 40 | .314 |
| 50 | 50 | .244 |
| 40 | 60 | .246 |
| 20 | 80 | .265 |
| 0 | 100 | .593 |

EXAMPLE 10

| 2% Exhaust Dyeing | | |
|---|---|---|
| Example 1 Dye | Example 3 Dye | Color Yield |
| 100 | 0 | .455 |
| 80 | 20 | .564 |
| 60 | 40 | .190 |
| 50 | 50 | .175 |
| 40 | 60 | .171 |
| 20 | 80 | .224 |
| 0 | 100 | .374 |

The dyestuff mixtures of this invention may be prepared and used as liquid dyestuff solutions of standard color strength. Preferably, these liquid dyestuff compositions should be adjusted to a pH of about 2.5 to about 4.5 to provide maximum storage stability and dye performance properties. These compositions also should be substantially free of buffer substances.

These foregoing examples are presented by way of illustration of the invention rather than for purposes of limitation.

We claim:

1. A water-soluble, fiber-reactive, yellow azo dyestuff mixture comprising a first and a second azo dyestuff wherein said first azo-dystuff has the formula

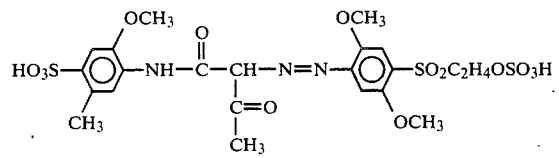

and said second azo-dyestuff has the formula

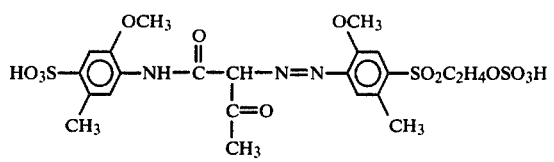

2. A water-soluble, fiber-reactive, yellow azo dyestuff mixture comprising a first and a second azo dyestuff wherein said first dyestuff has the formula:

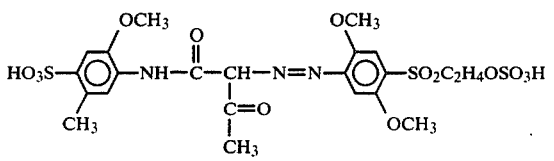

and said second dyestuff has the formula

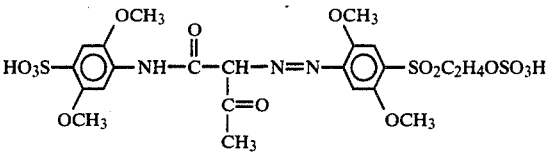

3. A watter-soluble, fiber-reactive, yellow azo dyestuff mixture comprising a first and a second azo dyestuff wherein said first dyestuff has the formula:

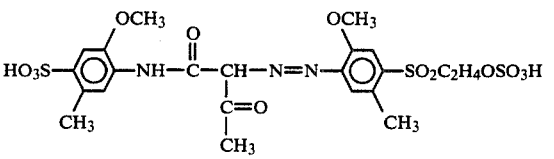

said second dyestuff has the formula:

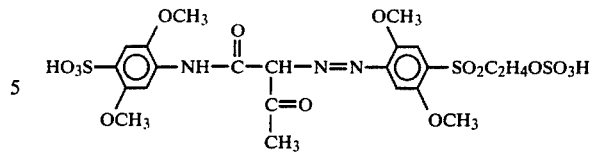

and wherein said first dyestuff is present in an amount from about 95 percent to about 80 percent by weight.

4. A dyestuff mixture according to claim 1 wherein said first dyestuff is present in an amount from about 95 percent to about 5 percent by weight.

5. A dyestuff mixture according to claim 1 wherein said first dyestuff is present in an amount from about 80 percent to about 20 percent by weight.

6. A dyestuff mixture according to claim 1 wherein said first dyestuff is present in an amount from 60 percent to about 40 percent by weight.

7. A dyestuff mixture according to claim 2 wherein said first dyestuff is present in an amount from about 95 percent to about 5 percent by weight.

8. A dyestuff mixture according to claim 2 wherein said first dyestuff is present in an amount from about 80 percent to about 20 percent by weight.

9. A dyestuff mixture according to claim 2 wherein said first dyestuff is present in amount from about 60 percent to about 40 percent by weight.

10. A dyestuff mixture according to claim 3 wherein said first dyestuff is present in an amount from about 90 percent to about 80 percent by weight.

11. A dyestuff mixture according to claim 3 wherein said first dyestuff is present in an amount of about 85 percent by weight.

12. An aqueous liquid dyestuff composition comprising about 25 to about 50 percent by weight of a dyestuff mixture according to claim 4, and about 50 to 75 percent of water; said liquid dyestuff having a pH of about 2.5 to 4.5 and being substantially free of buffer substances.

13. An aqueous liquid dyestuff composition comprising about 25 to about 50 percent by weight of a dyestuff mixture according to claim 5, and about 50 to 75 percent of water; said liquid dyestuff having a pH of about 2.5 to 4.5 and being substantially free of buffer substances.

14. An aqueous liquid dyestuff composition comprising about 25 to about 50 percent by weight of a dyestuff mixture according to claim 6, and about 50 to 75 percent of water; said liquid dyestuff having a pH of about 2.5 to 4.5 and being substantially free of buffer substances.

* * * * *

UNITED STATES PATENT AND TRADEMARK OFFICE
CERTIFICATE OF CORRECTION

PATENT NO. : 4,699,624

DATED : October 13, 1987

INVENTOR(S) : Thomas S. Phillips and Anthony J. Corso

It is certified that error appears in the above-identified patent and that said Letters Patent is hereby corrected as shown below:

IN THE SPECIFICATION:

Col. 1, line 18, the word "solar" should be replaced by the word -- color --.

Col. 3, line 14, the phrase, "the moiety Z for example" should read -- The moiety Z for example --.

Col. 4, line 4, please insert -- , -- between the words "claims unless".

Col. 5, line 48, the word "additionn" should read --addition--.

Col. 6, line 26, the word "strengthh" should read -- strength --.

Col. 6, line 44, the phrase, A 20:1 boiled-off, cotton" should read -- A 20:1 boiled-off, cotton yarn --.

IN THE CLAIMS:

Claim 1, line 58, the words "azo-dystuff" should read -- azo-dyestuff--.

Signed and Sealed this

Twenty-fourth Day of January, 1989

Attest:

DONALD J. QUIGG

Attesting Officer

Commissioner of Patents and Trademarks